May 24, 1960 F. R. TROTT 2,938,074

PICK-UP DEVICES FOR COLOUR TELEVISION

Filed March 13, 1958

Inventor
F. R. Trott
By Glascock Downing & Seebold
Attys.

2,938,074

PICK-UP DEVICES FOR COLOUR TELEVISION

Frank Runcorn Trott, Burnham, England, assignor to Electric & Musical Industries Limited, Hayes, England, a company of Great Britain Filed Mar. 13, 1958, Ser. No. 721,211

Claims priority, application Great Britain Mar. 15, 1957

4 Claims. (Cl. 178—5.4)

Figure 1:
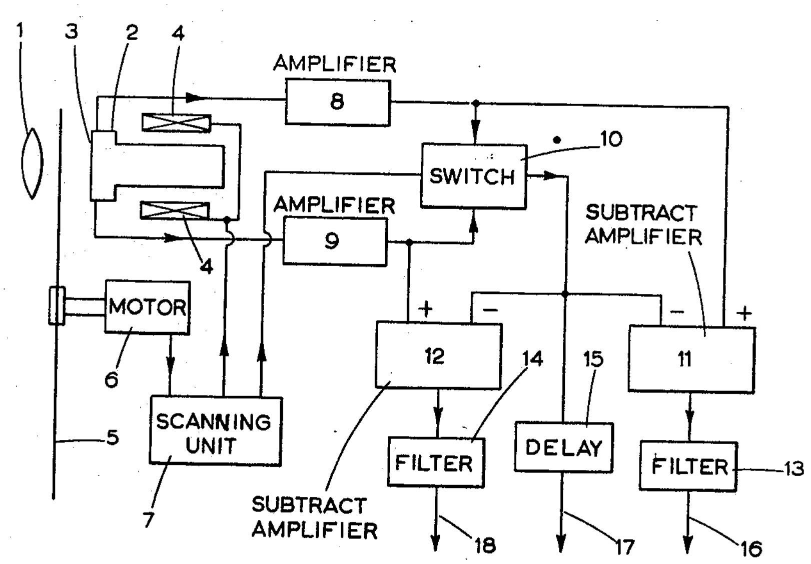

This invention relates to pick-up devices for colour television.

In colour television apparatus suitable for industrial applications, namely such as may be employed in a closed network, it is desirable that the expensive equipment should be maintained at a minimum. At present the only suitable receivers which are commercially feasible employ a three colour tube but a simple pick-up device for generating the signals for such a receiver is not hitherto available. It has been proposed to employ more than one pick-up tube in colour television cameras but difficulties are then experienced in providing registration, whilst if, as it has also been proposed, a single conventional type of pick-up tube is employed with a sequential analysing system, reception difficulties may be experienced. In receiving sequential signals for example on a display tube of the type intended for simultaneous signals, it may be necessary to increase the scanning rate if flicker is not to be intolerable but in either case mentioned the use of simultaneous type display tubes with sequential signals inevitably produces a significant drop in brightness.

To reduce the difficulties indicated it has been proposed to derive simultaneous signals representing three colour components of an image from a single charge storage target, by providing colour filter means which provides transmission of light of two of the colours to the target in line structure and transmission of the third colour without line structure. Therefore charges corresponding to two colour components of the image are stored on the target in lines and the target is scanned by an electron beam in such a way that the beam crosses the lines rapidly, whereby the resultant signals are in the form of carrier waves modulated in amplitude to represent the respective colour components. The spacing of the lines of one line structure is moreover arranged to be substantially different from the spacing of the lines of the other line structure so that one carrier wave and the side bands associated with it can be filtered from the other carrier wave and associated side bands. Signals corresponding to the remaining colour component are derived directly as video signals since the corresponding charge pattern does not have a line structure. The aforesaid carrier waves are arranged moreover to have such frequencies that their separation from this video signal is possible. This arrangement, whilst it reduces the difficulty indicated in the preceding paragraph, can also give rise to a further difficulty namely that the resolution of pick-up devices is usually such that the whole band-width of the output signals is inadequate to allow for generation of a video signal and two modulated carrier waves of reasonable definition for all the colour components required.

The object of the present invention is to provide an improved pick-up device for generating colour television signals and in which the above disadvantages are removed or at least substantially reduced.

According to the present invention there is provided a pick-up device for generating colour television signals comprising a charge storage target, means for scanning said target according to a television raster to derive electrical signals corresponding to charges stored by said target, and optical means for projecting an image on said target, including first filter means in the light transmission path to said target having alternate strips which transmit first and second colour components of corresponding areas of said image and intervening strips which transmit said first colour component and also a third colour component of corresponding areas of said image, second filter means which transmits said first and second colour components but not said third colour component and third filter means which transmits said first and third colour components but not said second colour components, means synchronised with said scanning means for introducing said second filter means into the light path to said target during alternate field periods and for introducing said third filter means into the light path to said target during intervening field periods, to cause charges corresponding to said first colour component to be stored on said target during alternate and intervening field periods, to cause charges corresponding to said second colour component of an image divided into a plurality of lines to be stored on said target during said alternate field periods and to cause charges corresponding to said third colour component divided into a plurality of lines to be stored on said target during said intervening field periods and means dependent upon said lines for separating signals corresponding to said colour components.

Figure 2:
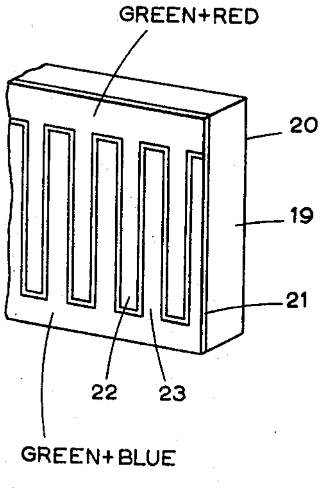
Figure 3:
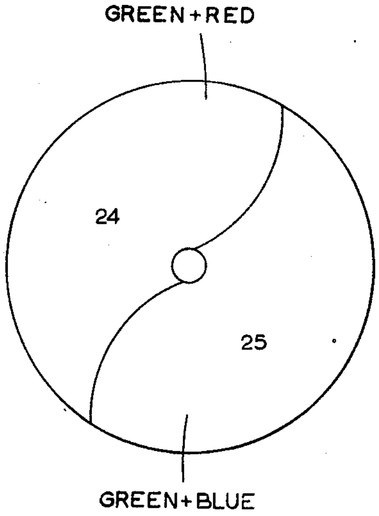

In order that the present invention may be clearly understood and readily carried into effect, a single embodiment of the invention will be described with reference to the accompanying drawing, in which:

Figure 1 illustrates mainly in block form a pick-up device according to the invention, Figure 2 is an amplification of part of Figure 1, and Figure 3 illustrates a rotatable filter suitable for use with the invention.

Referring to the drawing, light from the object is focused by the objective 1 onto the pick-up tube 2, which is a tube of the low velocity type having a target 3 which includes a charge storage mosaic screen. A fragment of the target is illustrated in Figure 2. In Figure 2 the target comprises a sheet of dielectric material 19 having a mosaic screen in the form of a multiplicity of discrete photo sensitive elements applied to the surface 20 of the dielectric sheet and having two mutually insulated signal plates 22 and 23 interleaved in comb-like manner applied to the opposite surface 21, each plate being in the form of a thin film of conductive material. The plates 22 and 23 also function as, or support, filter elements disposed so as to filter light passing to the mosaic screen. Thus one signal plate, say 22, only transmits signals representing red and green colour components and the other signal plate say 23 only transmits signals representing blue and green colour components. The target 3 is arranged moreover so that the lines of the raster traced by the scanning beam of the tube traverses the strips which make up 22 and 23 in a direction perpendicular to them.

It will be understood that the illustration in Figure 2 of the target is not to scale but merely illustrates the form of construction. Obviously the ratio of width to height of the strips in practice is very much reduced as compared with that shown and many more strips are in practice provided. The construction of the signal plates corresponds to that described in United States co-pending patent application Serial No. 455,975 though the colour filtering is different.

The frame scanning coils for 2 are denoted by 4. An additional filter 5 is situated between the objective lens 1 and the sensitive surface 3 of the pick-up tube and is arranged to have two sectors 24 and 25 which are transmitting for green plus red light and green plus blue light respectively as shown in Figure 3. The filter is arranged to rotate on the shaft of a synchronous motor 6 which is coupled to a frame scanning unit 7 which supplies the frame scanning waveform to the scanning coils 4. Thus if the field period is 1/50 second, the motor 6 is arranged to run at a speed of 25 revolutions per second. The outputs from the two signal plates of 3 are connected respectively to head amplifiers 8 and 9 which are of known form and are shown in block form in the figure. The outputs from 8 and 9 are connected to the input terminals of differencing amplifiers 11 and 12 of known form and to an electronic switching unit 10 which is controlled by signals from 7. The switching unit 10 comprises an electronic switch operated by switching pulses from 7, to connect the amplifier 8 to the output of the switch during alternate fields and to connect the amplifier 9 to the output during intervening fields. The switch 10 comprises a switch of the type described in U.S. patent specification No. 728,120 and shown in Figure 4 thereof. The output from 10 is connected to the negative terminals of the subtracting units 11 and 12 and also to a delay unit 15 having an output lead 17. The outputs from 11 and 12 are communicated to low pass filter units 13 and 14 which have output leads 16 and 18 respectively.

In operation of the present embodiment of the invention it is to be understood that for alternate fields scanned by the beam in the tube 2, sectors of the filter 5 green plus blue and green plus red are respectively positioned in front of the target 3 and the derived signals from the two signal plates 22 and 23 are signals representing green followed by green plus red and green plus blue followed by green respectively. A green signal is therefore always present in one or other of the outputs from 3 and the switch 10 is arranged to be operated by 7 in synchronism with the filter 5 to extract the green signal from one or other of the head amplifiers 8 and 9 and feed it to both differencing amplifiers 11 and 12.

In order that simultaneous signals are produced for subtraction as the electron beam of the pick-up tube scans the successive interleaved areas of the target the bandwidth of the amplifiers are predetermined to be such as to filter out the high frequency signal components produced by virtue of the interleaved nature of the target, or alternatively the interleaved strip areas may be so narrow that the scanning spot is always scanning two strips. For one frame therefore a green plus red signal is present at the positive input to 11 but a green signal being present at the negative terminal is subtracted from the signal at the positive terminal, thus providing a red signal at the output of 11 which is fed via the low pass filter 13 to 16. In the next frame period, however, only a green signal is output from 8 but a green plus blue signal is present at the output from 9 and the green component is subtracted from this by 12 so that the output from 12 which is fed via the low pass filter 14 to 18 represents only a blue component.

To clarify this, reference will be made to Figure 4. Figure 4 gives a diagrammatic illustration of the production of component colour signals in two successive fields for the apparatus of Figure 1. Thus it is assumed for the sake of simplicty that the optical system of the camera is focussed on a field of view which is made up of three vertical coloured strips of equal intensity, being magenta, green and cyan respectively. In the first field, it is assumed that the section 25 of the colour filter is intercepting light from the field of view to the pick up tube. It will be assumed moreover that the magenta comprises equal quantities of red and blue and the cyan comprises equal quantities of green and blue. The signal distributions on scanning across the interleaved signal plates of the pick up tube in the first field is therefore as shown. Since the plate 22 is responsive only to red and green components and the filter element 25 only passes green and blue, the red and blue components of magenta are lost, so that the magenta strip produces no response. However the green strip gives a full intensity response and the cyan strip gives a half intensity response corresponding to the green component therein. Plate 22 is therefore only responsive to green components in the field I. Plate 23 however is responsive to blue and green and field I and produces a half intensity component corresponding to magenta strip and full intensity components corresponding to the green and cyan strip.

In a similar manner to above, in field II the section 24 of the filter 5 interrupts light from the field of view to the pick up tube and plates A and B produce responses as shown under field II, plate B now being responsive only to green components and plate A being responsive to red and green components. Switch 10 receives a switching pulse during field II so that in field II the output of amplifier 10 comprises the signal derived from plate B say and is therefore subtracted from the signal derived from plate A to give a signal output representing the red component only of the field of view. Similarly, during field I no switch pulse is produced by 7 so that the switch 10 is in the opposite state and the difference signal now produced represents the blue component of the field of view.

Clearly subtraction of green from green in 11 or 12 in successive field periods can yield zero output signals.

The signals provided at 16, 17 and 18 are therefore red followed by zero signal, a virtually continuous green signal, and zero signal followed by blue signals, respectively and these signals may be employed in any suitable known manner in a colour television receiver to reproduce a representation of the field of view.

By virtue of the fact that the signal representing the green component is virtually continuous there is virtually no flicker in a picture reproduced using the present camera arrangement. The brightness of the blue signal furthermore is usually such that flicker is not likely to be unduly noticeable due to the blue signal being produced in alternate panels, but some flicker may, however, be noticeable in the red component of a picture if a large bright red area occurs. In this case a storage tube converter may be employed if required in the red channel in order to produce a more continuous red signal. One form of storage tube converter comprises a pick-up tube of the type described for example in United States Patent Number 2,507,958 and the target of the storage tube is first charged positive by flashing light onto the photo cathode of the tube during the intervals when no red signal is applied to the tube. The target is scanned by the electron beam during the following field and the thermionic cathode is modulated with the signal representing the red component of the picture. A charge pattern of the picture information is thereby left on the target of the tube and is read off during the next following field. Since the same electron beam and scanning circuits are employed in the tube for reading off and writing on the red signal any geometrical distortions introduced by the tube are cancelled out. Furthermore it will be appreciated that as the signals corresponding to green, red and blue colour components in the output of the pick-up tube need not be confined to separate frequency bands, the problems due to the limited band width are substantially reduced.

The purpose of the two low pass filters 13 and 14, although they are not an essential part of the arrangement, is to remove a substantial proportion of the noise signals which are developed in the output channels from the two signal plates of the tube. The delay circuit 15 is arranged to have an equivalent delay to that produced by 13 and 14 in order that coherent signals are provided at the outputs 16, 17 and 18.

Although in the description of the present embodiment of the invention the three colours into which the picture is divided are red, green and blue, the invention is clearly not limited to these three colours but any suitable combinations of colours may be employed.

What I claim is:

1. A pick up device for generating colour television signals comprising a charge storage target, means for scanning said target according to a television raster to derive electrical signals corresponding to charges stored by said target, and optical means for projecting an image on said target, including first filter means in the light transmission path to said target having alternate strips which transmit first and second colour components of corresponding areas of said image and intervening strips which transmit said first colour component and also a third colour component of corresponding areas of said image, second filter means which transmits said first and second colour components but not said third colour component and third filter means which transmits said first and third colour components but not said second colour components, means synchronised with said scanning means for introducing said second filter means into the light path to said target during alternate field periods and for introducing said third filter means into the light path to said target during intervening field periods, to cause charges corresponding to said first colour component to be stored on said target during alternate and intervening field periods, to cause charges corresponding to said second colour component of an image divided into a plurality of lines to be stored on said target during said alternate field periods and to cause charges corresponding to said third colour component divided into a plurality of lines to be stored on said target during said intervening field periods and means dependent upon said lines for separating signals corresponding to said colour components.

2. A pick up device according to claim 1, said target comprising two comb-like signal plates, said signal plates being interleaved so as to register respectively with said alternate and intervening strips of said first filter means.

3. A device according to claim 2, comprising means for subtracting signals derived from a first of said signal plates from signals derived from a second of said signal plates during alternate field periods and means for subtracting signals derived from said second signal plate from signals derived from said first signal plate during intervening field periods, and switching means synchronised with said arrangement for switching the outputs of said signal plates to cause a signal representing said first colour component to be derived during each field period to cause a signal representing said second colour component to be derived during alternate field periods and to cause a signal representing said third colour component to be derived during intervening field periods.

4. A device according to claim 3 wherein signal storage means is provided for storing one of the signals which is derived discontinuously.

No references cited.